United States Patent
Kobayashi

(10) Patent No.: US 8,036,163 B2
(45) Date of Patent: Oct. 11, 2011

(54) WIRELESS COMMUNICATION CONTROL SYSTEM AND METHOD THEREOF

(75) Inventor: Hideaki Kobayashi, Hyogo (JP)

(73) Assignee: Panasonic Corporation, Osaka (JP)

( * ) Notice: Subject to any disclaimer, the term of this patent is extended or adjusted under 35 U.S.C. 154(b) by 163 days.

(21) Appl. No.: 12/555,463

(22) Filed: Sep. 8, 2009

(65) Prior Publication Data

US 2010/0067382 A1    Mar. 18, 2010

(30) Foreign Application Priority Data

Sep. 10, 2008   (JP) .................................. 2008-231718

(51) Int. Cl.
*H04W 4/00* (2009.01)
(52) U.S. Cl. ........................................ 370/328
(58) Field of Classification Search .......... 370/310–313, 370/328–339, 349
See application file for complete search history.

(56) References Cited

U.S. PATENT DOCUMENTS

| | | | |
|---|---|---|---|
| 6,957,067 B1* | 10/2005 | Iyer et al. ................... | 455/435.1 |
| 7,400,901 B2* | 7/2008 | Kostic et al. ................. | 455/525 |
| 7,406,319 B2* | 7/2008 | Kostic et al. ................. | 455/453 |
| 7,480,264 B1* | 1/2009 | Duo et al. .................... | 370/310.2 |
| 2004/0192221 A1* | 9/2004 | Matsunaga ...................... | 455/76 |
| 2007/0054645 A1 | 3/2007 | Pan | |

FOREIGN PATENT DOCUMENTS

JP    2007-074193    3/2007

* cited by examiner

*Primary Examiner* — Frank Duong
(74) *Attorney, Agent, or Firm* — Renner, Otto, Boisselle & Sklar, LLP

(57) ABSTRACT

A wireless communications control system includes: a data server; a base station; and a plurality of wireless terminals, each exchanging data communications with the data server by establishing wireless communications with the base station. Each wireless terminal includes a control section for generating property information representing own property and a wireless communications section for transmitting that property information to the base station. The property information includes at least one of information indicating operating status of the wireless terminal, information identifying the wireless terminal itself, and information identifying the user of the wireless terminal. The data server includes a communications section for receiving the property information from the respective wireless terminals by way of the base station and a control section for choosing, by reference to the property information received, one of the wireless terminals to exchange the data communications with. The control section of the data server exchanges the data communications with the wireless terminal chosen.

11 Claims, 12 Drawing Sheets

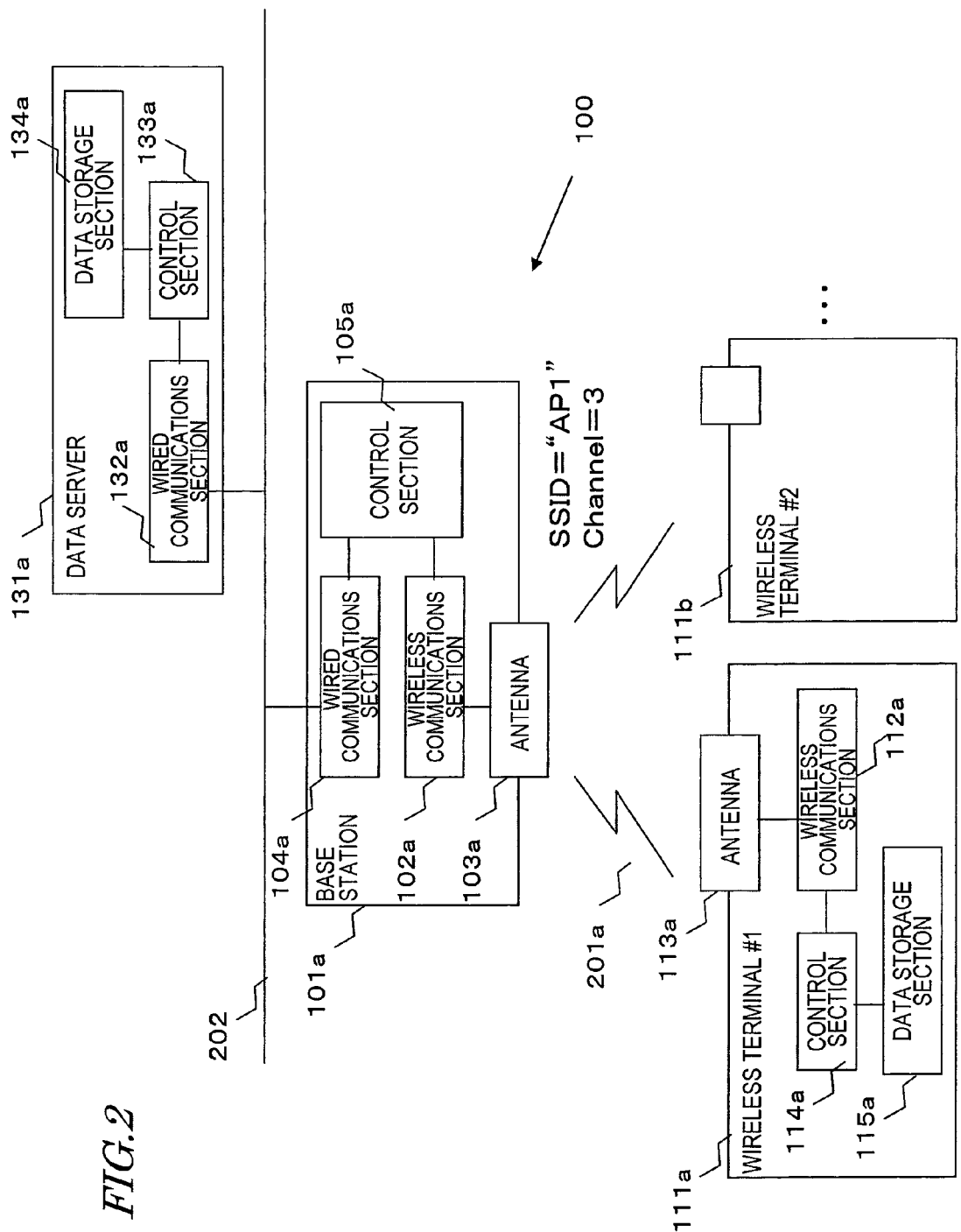

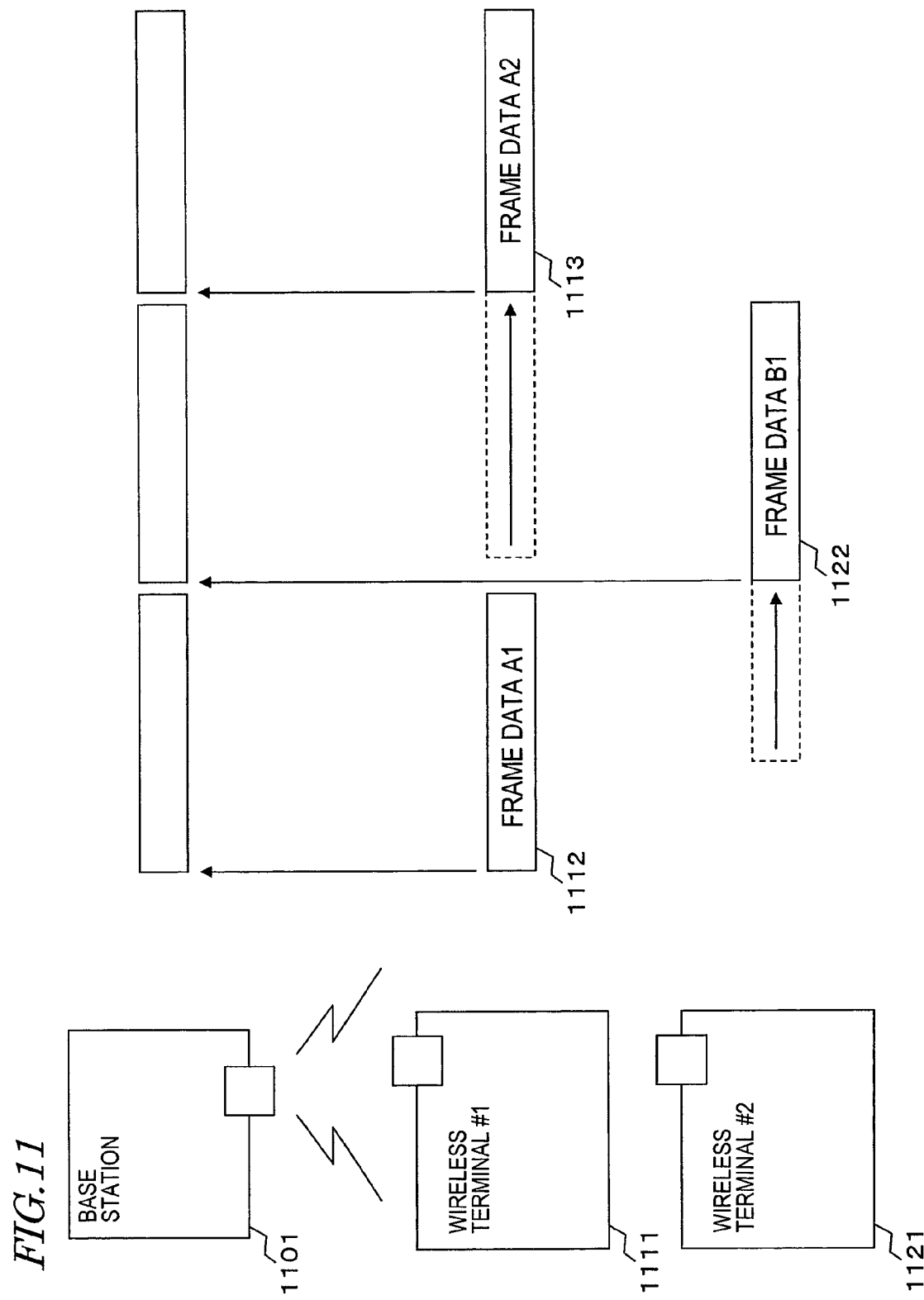

FIG.12A

WIRELESS TERMINAL #1
LINK RATE : 48Mbps

| A1 | A2 | A3 | A4 |

WIRELESS TERMINAL #2
LINK RATE : 24Mbps

| B1 | B2 | B3 | B4 |

| A1 | B1 | A2 | B2 | A3 | B3 | A4 | B4 |

Ta1
Tb1

WIRELESS COMMUNICATION CONTROL SYSTEM AND METHOD THEREOF

BACKGROUND OF THE INVENTION

1. Field of the Invention

The present invention relates to a wireless communications control technology and more particularly relates to a control technology for maintaining data communications efficiently in a wireless communications environment where a number of terminals share a limited band.

2. Description of the Related Art

In the field of wireless communications such as mobile telecommunications over a wireless LAN or a cellphone network, a number of terminals keep up data communications by sharing a certain wavelength band. In such a wireless communications environment, the average communication speed (i.e., the rate at which each of those terminals can get transmission or reception done) is usually lower than a situation where a single terminal exchanges data communications by itself. This is because if a number of terminals need to maintain data communications concurrently with each other, those terminals should share a limited band in accordance with the wireless communications access control method defined.

Hereinafter, a telecommunications technique using a wireless LAN will be described as a specific example.

FIG. 11 outlines the CSMA/CA (Carrier Sense Multiple Access with Collision Avoidance) control system, which is an exemplary wireless LAN access control system. Suppose a situation where one wireless terminal 1111 is transmitting frame data (A1) 1112 to a base station 1101, while another wireless terminal 1121 is going to establish communication with the base station 1101. In that case, the wireless terminal 1121 cannot establish communication until the wireless terminal 1111 has transmitted the frame data (A1) 1112 completely. After the frame data (A1) 1112 has been transmitted, the wireless terminal 1121 starts to transmit another frame data (B1) 1122 to the base station 1101. And when the transmission of the frame data (B1) 1122 is complete, the wireless terminal 1111 starts to transmit next frame data (A2) 1113 to the base station 1101 again. In this manner, even if multiple terminals are attempting to keep up data communications concurrently, all wireless terminals other than the one that is communicating with the base station must wait until it gets ready to establish communication. As a result, the average communication speed of the wireless terminals will decrease, which is a problem.

Furthermore, in a wireless LAN, the link rate between the base station and each wireless terminal could vary according to the distance from the base station to the wireless terminal and/or the status of radio waves. For example, according to the IEEE 802.11g standard (which is one of wireless LAN telecommunications standards that were defined by the Institute of Electrical and Electronic Engineers in the United States), the link rate between a base station and each wireless terminal should be one of 54, 48, 36, 24, 18, 12, 9 and 6 Mbps, and the link rates could be different between any two of the wireless terminals. In that case, if one tries to establish communications at a relatively high link rate and at a relatively low link rate concurrently, then even the average data communication speed of a wireless terminal with the relatively high link rate would be determined by that of another wireless terminal with the relatively low link rate. That is also a problem.

To overcome such a problem, according to a conventional method, a band control technique is adopted. As for a wireless LAN, for example, the IEEE 802.11e standard was set up to define how to implement the QoS (Quality of Service) technique for ensuring a certain communication speed by reserving a band for a particular type of communications. By using a combination of a base station and wireless terminals that are compliant with the IEEE 802.11e standard, data communications between the base station and a particular one of the wireless terminals can be controlled preferentially. Another conventional technique proposed uses a base station that has the ability to exchange data with a particular wireless terminal while controlling access by the other wireless terminals with lower link rates than the current one (see Japanese Patent Application Laid-Open Publication No. 2007-74193, for example).

According to a wireless LAN implementation that uses a base station to which such a band control technique has been introduced in advance, however, normally only limited band control functions are available, among which not every wireless LAN user can find his or her desired band control function. Also, if a base station to which none of those band control functions available is introduced is used, then such a base station cannot provide the band control function that the user of the wireless LAN needs.

For example, suppose the user needs such a band control function for controlling the sum of the amounts of time it has taken for multiple wireless terminals, all of which have requested to establish data communication in a wireless LAN communications network that does not require real-time communications, to get their communications done. FIGS. 12A and 12B illustrate the amount of time it has taken for each of wireless terminals #1 and #2 to get data communications with the base station done by itself. Specifically, it has taken an amount of time Ta for the wireless terminal #1 to get frame data A1 through A4 transmitted completely, while it has taken an amount of time Tb for the wireless terminal #2 to get frame data B1 through B4 transmitted completely. In this case, the minimum sum of those amounts of time taken is Ta+Tb, theoretically speaking.

Suppose these two wireless terminals have the same data communication rate and require the same amount of collision avoidance process time by CSMA/CA control for the sake of simplicity. Also, each of those frame data A1 through A4 and B1 through B4 to transmit is supposed to have the same data size and the wireless terminals #1 and #2 are supposed to have link rates of 48 Mbps and 24 Mbps, respectively.

If their actual communication speeds are as high as their link rates, the amount of time Tb it will take for the wireless terminal #2 to get the frame data B1 through B4 transmitted will be exactly twice as long as the amount of time Ta it will take for the wireless terminal #1 to get the frame data A1 through A4 transmitted. FIG. 12C shows the total amount of time it will take for these two wireless terminals to establish data communications with a base station with no band control capabilities in a situation where the communications need to be done on an equal opportunity basis. In that case, the frame data A1 will be transmitted first, the frame data B1 next, and then those two wireless terminals will alternately communicate with the base station on a frame data basis. That is why the total amount of time Tb1 it will take until the wireless terminal #2 gets the last frame data B4 transmitted will be Ta+Tb. Meanwhile, the total amount of time Ta1 it will take until the wireless terminal #1 gets the last frame data A4 transmitted is obtained by subtracting the amount of time it will take to transmit the frame data B4 from the total amount of time Tb1. Consequently, the sum of those amounts of time Ta1+Tb1 is given by (Ta+Tb)+(Ta+Tb−the amount of time it takes to transmit the frame data B4). Thus, a band control technique for reducing that total amount of time to the theoretical minimum sum Ta+Tb is required.

In the case of wireless LAN communications, even if the communications started at a constant link rate, the link rate could still change after that during the communications due to a variation in the status of radio waves, for example. That is why if the user needs a band control technique for keeping up communications using a wireless terminal with the highest link rate preferentially, then the wireless terminals to which a top priority is given should be changed during the communications. Also, even though some user may want to maintain communications until a wireless terminal that has once opened up a communication gets that communication done, another user may want to interrupt such a communication that has been once opened up by some wireless terminal but that has not been done yet and switch to a communication by another wireless terminal with a higher priority.

Furthermore, in some situation, the user may happen to change his or her mind and want to switch from the band control technique for minimizing the total amount of times it will take for multiple wireless terminals to get their communications done into the one for giving a top priority to communications by a particular wireless terminal.

As described above, if the band control technique required may be different from one user to another, it is usually difficult to get a base station in which all of those different band control functions are incorporated in advance.

SUMMARY OF THE INVENTION

It is therefore an object of the present invention to realize a band control function, required by the user of a wireless communications system, by using a base station to which no band control function is incorporated in particular.

A wireless communications control system according to the present invention includes: a data server; at least one base station; and a plurality of wireless terminals, each of which exchanges data communications with the data server by establishing wireless communications with the base station. If the number of the at least one base station is one, each said wireless terminal includes: a control section for generating, as property information representing its own property, at least one of information indicating the operating status of the wireless terminal, information identifying the wireless terminal itself, and information identifying the user of the wireless terminal; and a wireless communications section for transmitting that property information to the base station. The data server includes: a communications section for receiving the property information from the respective wireless terminals by way of the base station; and a control section for choosing, by reference to the property information received, one of the wireless terminals to exchange the data communications with. The control section of the data server exchanges the data communications with the wireless terminal chosen.

If the at least one base station includes a plurality of base stations, those base stations may be identifiable from each other on a network. Each said wireless terminal may establish wireless communications with one of those base stations. The wireless communications section of each said wireless terminal may transmit the property information and base station identifying information to identify the base station to establish the wireless communications with. The communications section of the data server may receive the property information and the base station identifying information from the respective wireless terminals by way of the base stations. The control section of the data server may determine the wireless terminal to exchange the data communications with by base station basis by reference to the property information and the base station identifying information received.

The property information may include at least one of a link rate between the base station and each said wireless terminal, an estimated time when the data communications are expected to end, a running time that has passed since the data communications were opened up, the available space in a data storage section of each said wireless terminal, and a constant defined for each said wireless terminal.

If while exchanging data communications with a first one of the wireless terminals, the data server receives a data communication request and property information from a second one of the wireless terminals, the control section of the data server may determine, by reference to the property information of the first wireless terminal and the property information received from the second wireless terminal, which of the first and second wireless terminals needs to be given the priority to maintain or establish the data communications with.

If it has been determined that the second wireless terminal has the priority to establish the data communications with, the control section of the data server may interrupt the ongoing data communications and may open up data communications with the second wireless terminal newly chosen.

The base station identifying information may include at least one of an SSID, an MAC address and an IP address that have been given to the base station.

The base stations may be identified by mutually different kinds of base station identifying information, and the control section of the data server may determine which wireless terminal has the priority to establish data communications for each set of wireless terminals that have transmitted the same kind of base station identifying information.

By comparing pieces of the property information of multiple wireless terminals, belonging to mutually different sets, to each other, the control section of the data server may determine which wireless terminal has the priority to establish the data communications.

One of the wireless terminals may further include a display section to display information thereon. The display section may display at least one of information indicating that the data communications are now in progress, information indicating that the data communications now need to wait, estimated start and end times of the data communications and the running time that has passed since the data communications were opened up.

Another wireless communications control system according to the present invention includes: a base station; a plurality of data servers; a plurality of wireless terminals, each of which exchanges data communications with an associated one of the data servers by establishing wireless communications with the base station; and a load balancer for distributing data communications between the wireless terminals and the data servers. Each said wireless terminal includes: a control section for generating, as property information representing its own property, at least one of information indicating the operating status of the wireless terminal, information identifying the wireless terminal itself, and information identifying the user of the wireless terminal; and a wireless communications section for transmitting that property information to the base station. The load balancer includes: a communications section for receiving the property information from the respective wireless terminals by way of the base station; and a control section for choosing, according to the property information received, one of the wireless terminals and one of the data servers between which the data communications need to be exchanged. The control section of the data server exchanges the data communications with the wireless terminal chosen.

If while exchanging data communications with a first one of the wireless terminals, the load balancer receives a data communication request and property information from a second one of the wireless terminals, the control section of the load balancer may determine, by reference to the property information of the first wireless terminal and the property information received from the second wireless terminal, which of the first and second wireless terminals needs to be given the priority to maintain or establish the data communications with.

If it has been determined that the second wireless terminal has the priority to establish the data communications with, the control section of the data server may interrupt the ongoing data communications and may open up data communications with the second wireless terminal newly chosen.

A wireless communications control method according to the present invention is designed to be used in a wireless communications control system that includes: a data server; at least one base station; and a plurality of wireless terminals, each of which exchanges data communications with the data server by establishing wireless communications with the base station. If the number of the at least one base station is one, the method includes the steps of: having each said wireless terminal generate, as property information representing its own property, at least one of information indicating the operating status of the wireless terminal, information identifying the wireless terminal itself, and information identifying the user of the wireless terminal; getting that property information transmitted by the wireless terminal to the base station; getting the property information received by the data server from the respective wireless terminals by way of the base station; having the data server choose, by reference to the property information received, one of the wireless terminals to exchange the data communications with; and letting the data server exchange the data communications with the wireless terminal chosen.

According to the wireless communications control method of the present invention, the band control function required by the user of a wireless communications system can be performed using a base station in which no band control function is incorporated.

BRIEF DESCRIPTION OF THE DRAWINGS

FIG. 2 is a block diagram illustrating the architecture of a wireless communications control system 100 as a first specific preferred embodiment of the present invention.

FIG. 11 outlines the CSMA/CA control system, which is an exemplary wireless LAN access control system.

FIG. 12A illustrates the amount of time it has taken for wireless terminal #1 to get data communications with the base station done by itself.

FIG. 12B illustrates the amount of time it has taken for wireless terminal #2 to get data communications with the base station done by itself.

FIG. 12C shows the total amount of time it will take for these two wireless terminals to establish data communications with a base station with no band control capabilities in a situation where the communications need to be done on an equal opportunity basis.

DETAILED DESCRIPTION OF PREFERRED EMBODIMENTS

Hereinafter, the best mode for carrying out the present invention will be described.

Embodiment 1

First of all, it will be described with reference to FIGS. 1A and 1B how to exchange data communications between a base station and wireless terminals in a wireless communications control system as a preferred embodiment of the present invention. In this example, the data communications are supposed to be exchanged between each of two wireless terminals and one base station. In this case, the wireless terminals #1 and #2 are supposed to be linked to the base station under the same conditions as the ones shown in FIGS. 12A and 12B. Also, suppose that to transmit the same amount of data, the wireless terminal #1 needs a communication time Ta and the wireless terminal #2 needs a communication time Tb.

Figure 1A:
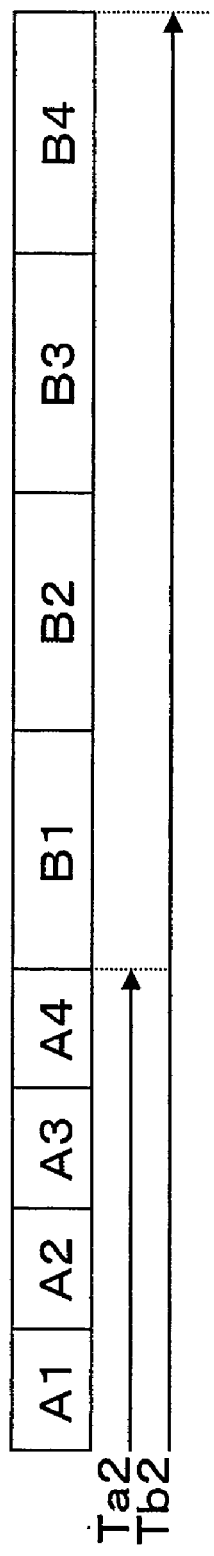
FIG. 1A illustrates the amount of time it has taken in a situation where the wireless terminal #1 with the higher link rate has always been given the higher priority to keep up the data communications than the other wireless terminal.
Figure 1B:
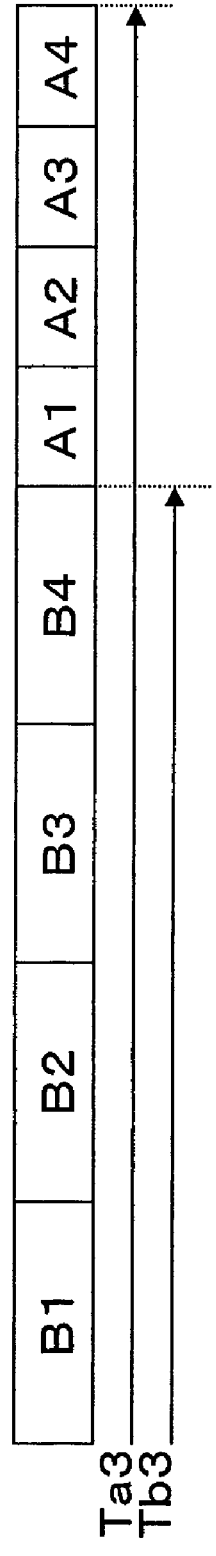
FIG. 1B illustrates the amount of time it has taken in a situation where the wireless terminal #2 with the lower link rate has always been given the higher priority to keep up the data communications than the other wireless terminal.

FIGS. 1A and 1B illustrate how a band control may be carried out in a situation where data communications are exchanged between a base station and two wireless terminals.

Specifically, FIG. 1A illustrates the amount of time it has taken in a situation where the wireless terminal #1 with the higher link rate has always been given the higher priority to keep up the data communications than the other wireless terminal. In that case, the amount of time Ta2 it has taken for the wireless terminal #1 becomes the same as the amount of time Ta. On the other hand, since it is not until the communications by the wireless terminal #1 are done that the wireless terminal #2 can start its communications, the amount of time Tb2 becomes equal to Ta+Tb.

On the other hand, FIG. 1B illustrates the amount of time it has taken in a situation where the wireless terminal #2 with the lower link rate has always been given the higher priority to keep up the data communications than the other wireless terminal. In that case, the amount of time Tb3 it has taken for the wireless terminal #2 is as long as the amount of time Tb. On the other hand, since it is not until the communications by the wireless terminal #2 are done that the wireless terminal #1 can start its communications, the amount of time Ta3 becomes equal to Ta+Tb.

By comparing the communication times shown in FIGS. 1A and 1B to the communication times shown in FIG. 12C, the following conclusion can be drawn. Specifically, compared to the band control method shown in FIG. 12C in which data communications are exchanged on an equal opportunity basis between multiple wireless terminals and a base station with no band control capabilities, the sum of the amounts of time it has taken for the respective wireless terminals to get their communication done can be reduced by the band control method shown in FIGS. 1A and 1B in which one of the two wireless terminals is always given the higher priority to exchange data communications and the other wireless terminal is allowed to open up its data communications sequentially only after the former wireless terminal has completed its communications. In the latter case, as for the wireless terminal that has done its data communications earlier than the other wireless terminal, the computer resource can be allocated to that wireless terminal to get another kind of processing done. On top of that, the other devices that have received the data over the same network can also start their processing. Consequently, the computer resource of the overall network can also be used more efficiency and more effectively.

That is why according to this preferred embodiment, data is supposed to be transmitted in the mode shown in FIG. 1A or 1B as a matter of principle.

FIG. 2 is a block diagram illustrating the architecture of a wireless communications control system 100 as a preferred embodiment of the present invention. The wireless communications control system 100 includes a wireless LAN communications base station 101a, wireless terminals 111a and 111b and a data server 131a.

The base station 101a for the wireless LAN communications includes a wireless communications section 102a, a wireless LAN communications antenna 103a, a wired communications section 104a and a control section 105a. The wireless communications section 102a establishes wireless communications with the wireless terminals 111a and 111b by way of the antenna 103a and a wireless LAN communications network 201a between the base station 101a and the wireless terminals. On the other hand, the wired communications section 104a keeps up communications with the data server 131a by way of a wired communications network 202. The control section 105a controls the communications maintained by the wireless communications section 102a and the wired communications section 104a and relays the communications between the data server 131a and the wireless terminals 111a and 111b.

The wireless LAN communications wireless terminal 111a includes a wireless communications section 112a, a wireless LAN communications antenna 113a, a control section 114a and a data storage section 115a. The wireless communications section 112a exchanges communications with the base station 101a via the antenna 103a. The control section 114a transfers the data that has been stored in the data storage section 115a to the wireless communications section 112a, thereby getting the data transmitted to the base station 101a. Also, the control section 114a gets the data that has been received by the wireless communications section 112a from the base station 101a stored into the data storage section 115a. The other wireless terminal 111b has the same configuration as this wireless terminal 111a. In FIG. 2, the illustration of the components of the wireless terminal 111b is omitted for the sake of simplicity.

The data server 131a includes a wired communications section 132a, a control section 133a and a data storage section 134a. The wired communications section 132a exchanges communications with the base station 101a over the wired communications network between the base station 101a and the data server 131a.

Each of these wireless terminals may be implemented in any form of device as long as the device has wireless LAN communication capability. For example, each wireless terminal may be a PC, a PDA, a game console, or a camera that can be connected to a wireless LAN.

Meanwhile, the base station 101a may be implemented as an access point or a router with wireless and wired LAN communication capabilities.

The data server may be implemented in any form of device as long as the server can transmit, receive and store data. For example, the data server may be a PC, an NAS (network attached storage) or a recorder for recording TV programs.

Each of the control sections 105a, 114a and 133a shown in FIG. 2 may be implemented as a microprocessor, which is also called a "microcomputer", a "CPU" or an "MPU". Examples of the data storage sections 115a and 134a include magnetic recording media (such as a hard disk), semiconductor storage media (such as a flash memory and a memory card), and optical storage media (such as a CD, a DVD and a BD). Optionally, the data storage sections may include a controller that controls reading of data from and writing of data on any of the storage media mentioned above. In that case, each data storage section is implemented as an HDD (hard disk drive), an SSD (solid state drive) or an optical disc drive.

Each of the wired communication sections 104a and 132a is implemented as a chip circuit called a "network controller", and establishes wired communications compliant with an Ethernet(registered trademark) standard such as 1000 BASE-T or 100 BASE-TX. And each of the wireless communications sections 102a and 112a is implemented as a chip circuit called a "wireless LAN controller" and establishes wireless communications compliant with IEEE 802.11a/b/g via the antenna 103a or 113a.

Figure 3:
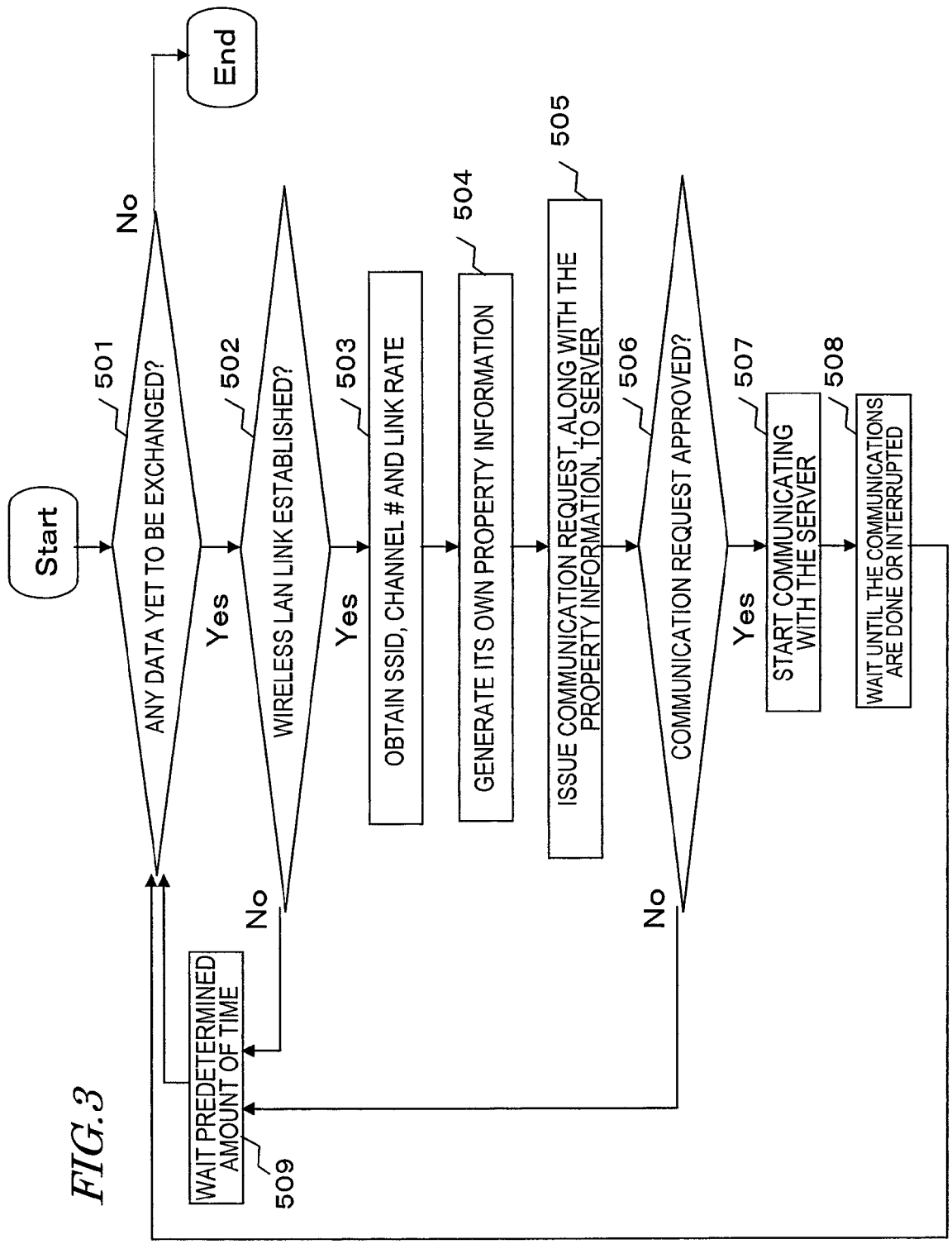
FIG. 3 is a flowchart showing how to control the wireless communications that are maintained by each wireless terminal according to the first preferred embodiment.

FIG. 3 is a flowchart showing how to control the wireless communications maintained by each wireless terminal according to this preferred embodiment. In the following example, suppose the wireless terminal 111a is going to establish wireless communications.

First, in Step 501, the control section 114a determines whether or not there is any data yet to be exchanged between the wireless terminal 111a and the data server 131a. The control section 114a is well aware of the status of the data communications and will end the process immediately if there is no data yet to be exchanged. However, if there is any data yet to be exchanged, then the process advances to Step 502.

Next, in Step 502, it is determined whether or not a wireless LAN communications link has been established between the base station 101a and the wireless terminal 111a (i.e., whether or not the wireless terminal 111a has been connected to the base station 101a over the LAN). If the answer is NO, the process advances to Step 509, in which the system waits for a predetermined amount of time, and then goes back to the processing step 501 or 502. On the other hand, if the link has already been established between them, then the process advances to Step 503.

In the processing step 503, the control section 114a obtains information about the SSID (service set identifier) of the base station in the wireless LAN communications link that has already been established, the number of the channel used in the wireless LAN, and the link rate with the base station 101a. Next, in Step 504, the control section 114a generates the property information of the wireless terminal 111a itself.

As used herein, the "property information" is information representing properties of the wireless terminal 111a in the wireless communications control system 100. The property information is at least one of information indicating the operating status of the wireless terminal 111a, information identifying the wireless terminal 111a itself in the wireless communications control system 100, and information identifying the user of the wireless terminal 111a.

Specifically, the following information could be included in the property information. The information indicating the operating status of the wireless terminal 111a may be the information that has been obtained in Step 503 about the link rate between the wireless terminal 111a and the base station 101a, the SSID of the base station, and the number of the channel used in the wireless LAN. The information identifying the wireless terminal 111a may be the IP address of the wireless terminal 111a in the wireless communications control system 100, for example. And the information identifying the user of the wireless terminal 111a may be a log in ID for use to log in a PC, the ID written on an employee's ID card, or an ID that is written on a USB memory, which needs to be loaded to use the wireless terminal 111a, to identify the user uniquely.

Now take a look at FIG. 3 again. Next, in Step 505, the control section 114a issues a communication request, which will be transmitted to the data server 131a along with the property information that has been generated in the previous processing step 504. Then, in Step 506, the control section 114a determines whether or not the communication request issued has been approved by the data server 131a. If the answer is NO, the process advances to Step 509, in which the system waits for a predetermined amount of time, and then goes back to the processing step 501, 502 or 505. On the other hand, if the communication request has been approved, then the process advances to Step 507. Optionally, if the communication request has been declined, the control section 114a may resend the communication request to the server every several seconds to every few minutes.

In Step 507, the control section 114a starts communicating the data yet to be exchanged to the data server 131a by way of the base station 101a. Next, in Step 508, the control section 114a waits until the communications with the data server 131a are done or interrupted. When the communications end or get interrupted, the process will go back to the processing step 501.

Figure 4:
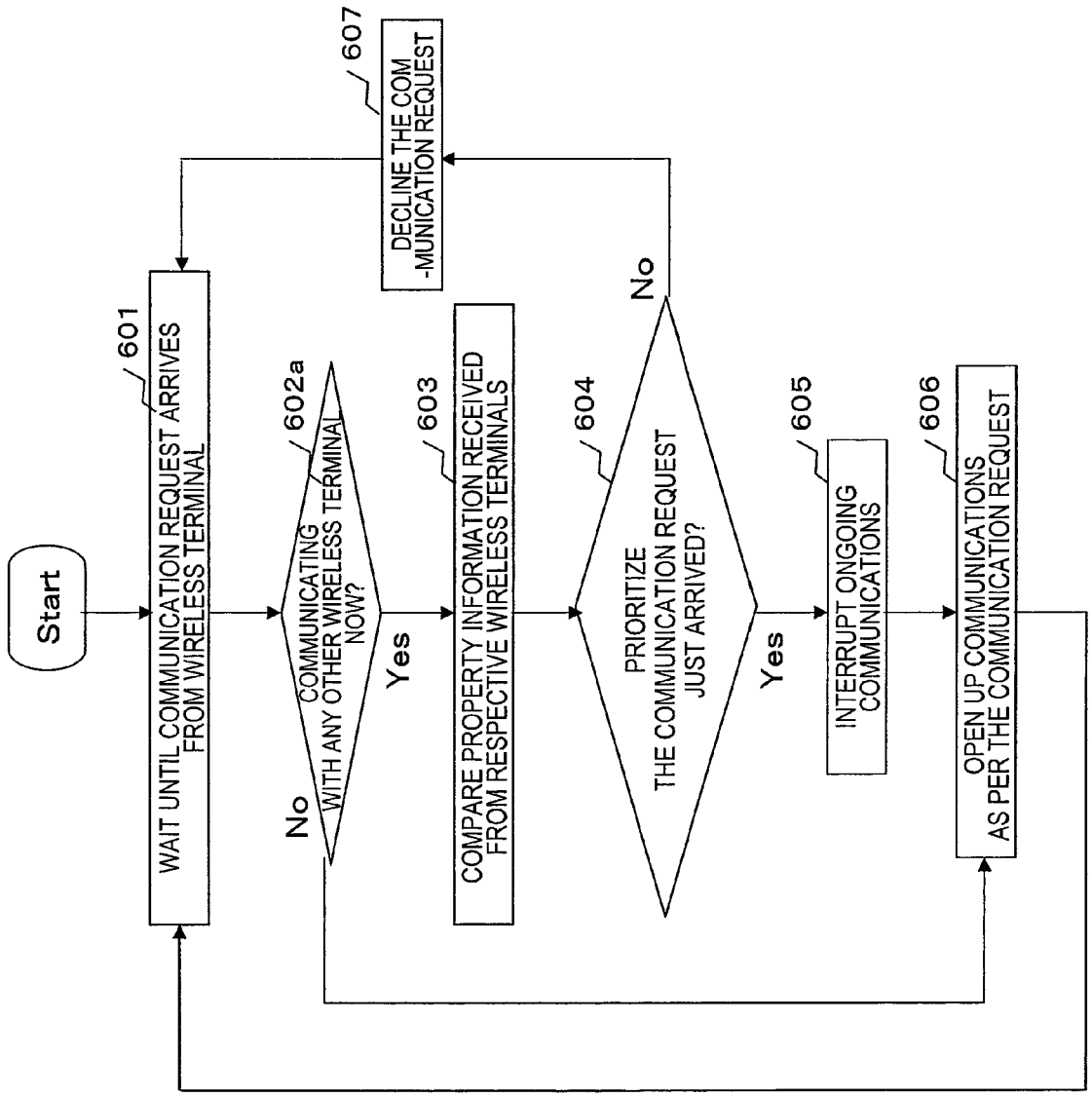
FIG. 4 is a flowchart showing how the control section 133a of the data server 131a controls the wireless communications according to the first preferred embodiment.

FIG. 4 is a flowchart showing how the control section 133a of the data server 131a controls the wireless communications according to this preferred embodiment.

First of all, in Step 601, the control section 133a waits until the request to communicate the data yet to be exchanged from the data server 131a to each wireless terminal and the property information of the wireless terminal arrive from that wireless terminal. On receiving the communication request from the wireless terminal, the process advances to Step 602a, in which the control section 133a determines whether or not the data server 131a is communicating with any other wireless terminal by now. If the answer is NO (i.e., if the data server 131a is not communicating with any other wireless terminal when the communication request is received), the process advances to Step 606, in which the control section 133a opens up the communications as per the communication request. On the other hand, if the answer is YES (i.e., if the data server 131a is already communicating with another wireless terminal), then the process advances to Step 603.

In the processing step 603, the control section 133a compares the property information, which has been received in Step 601 from each wireless terminal along with the communication request, to that of the wireless terminal that the data server 131a is already communicating with.

Thereafter, in Step 604, the control section 133a determines, based on the result of the comparison that has been made in the previous processing step 603, whether or not the communication request received in Step 601 should be given a higher priority over the ongoing communications. It will be described in detail later exactly on what criterion that decision needs to be made.

If the answer is NO (i.e., if the ongoing communications should be given a higher priority over the communication request received), the process advances to Step 607, in which the control section 133a tells the wireless terminal that has issued the communication request that the data server 131a has declined the communication request, and then goes back to the processing step 601. On the other hand, if the answer is YES (i.e., the communication request received should be given a higher priority over the ongoing communications), then the process advances to Step 605, in which the control section 133a interrupts the communications with that another wireless terminal. Then, in Step 606, the control section 133a opens up the communications as per the communication request received in Step 601.

Hereinafter, the overall operation of the wireless communications control system 100 of this preferred embodiment will be described with reference to FIGS. 2 to 4. In the following example, data is supposed to be transmitted from each wireless terminal to the data server 131a. However, the same statement will apply to the opposite situation where data is supposed to be received by each wireless terminal from the data server 131a.

First of all, suppose the data to be transmitted to, and get stored in, the data storage section 134a of the data server 131a is now stored in the data storage section 115a of the wireless terminal 111a. Unless a wireless LAN link can be established because the wireless terminal 111a is located too far away from the base station 101a or because radio waves are not stabilized, the data cannot be transmitted from the data storage section 115a toward the data server 131a.

However, when the respective wireless communications sections 102a and 112a of the base station 101a and the wireless terminal 111a can get connected to each other to establish a wireless LAN communications network 201a between them because the wireless terminal 111a is now located at an affordable distance from the base station 101a or because the radio wave have gotten stabilized, the data can be transmitted from the data storage section 115a of the wireless terminal 111a toward the data storage section 134a of the data server 131a.

In this case, since the data yet to be exchanged is now stored in the data storage section 115a (i.e., the answer to the query of the processing step 501 shown in FIG. 3 is YES) and since the wireless LAN communications network 201a has already been established between the base station 101*a* and the wireless terminal 111*a* (i.e., the answer to the query of the processing step 502 is also YES), the control section 114*a* of the wireless terminal 111*a* obtains information about the SSID of the base station, the number of the channel used in the wireless LAN, and the link rate between the base station and the wireless terminal (in Step 503). In this example, the SSID, wireless LAN channel number, and the link rate are supposed to be AP1, #3 and 54, respectively.

Next, the control section 114*a* of the wireless terminal 111*a* generates the property information of the wireless terminal 111*a* (in Step 504). Examples of the property information include information about the link rate, the size of the data to transmit, an estimated amount of time it will take to get the data transmitted successfully (which is calculated based on the transfer rate and the size of the remaining data yet to be transmitted), the space left in the data storage section 115*a*, and a constant defined for each wireless terminal (such as a value representing the predefined rank of priority of each wireless terminal). Also, if the data is already being communicated, the running time it has passed since the data started to be transmitted could also be a part of the property information. Anyway, the property information may include at least one of these various sorts of information.

For example, if a plurality of wireless terminals are issuing a data transmission request at the same time to the data server 131*a*, the data server 131*a* uses the property information to determine to which wireless terminal the data should start to be transmitted and which wireless terminal should wait until the data server 131*a* gets ready to start the data transmission requested. For instance, if it has been determined in advance that a particular one of the wireless terminals should be given a higher priority over the other terminals when it comes to getting the data transmission started and if the control section 133*a* of the data server 131*a* retains that information, then the control section 133*a* will start the data communications with that wireless terminal as soon as the wireless terminal that has transmitted the property information is identified to be that particular wireless terminal.

Optionally, the value itself of the link rate information that has been obtained from the base station 101*a* may be used as the property information. Supposing the link rate between the wireless terminal 111*a* and the base station 101*a* is 54 Mbps and the link rate between the wireless terminal 111*a* and the base station 101*a* is 36 Mbps, the link rate information of 54 and 36 may be used as pieces of information representing the operating status of the wireless terminal 111*a* that form parts of the property information.

Alternatively, the degree of priority may also be calculated by dividing the data size by the link rate. Suppose the link rate between the base station and the wireless terminal #1 is 54 Mbps and the wireless terminal #1 should transmit data with a size of 1,080 MB, while the link rate between the base station and the wireless terminal #2 is 36 Mbps and the wireless terminal #2 should transmit data with a size of 900 MB. In that case, 20 and 25 may be adopted as values representing the property information. Still alternatively, to always give a higher priority to a particular wireless terminal, the maximum value could to be assigned to only that wireless terminal constantly.

Next, the control section 114*a* of the wireless terminal 111*a* sends not only the property information generated but also a data communication request (i.e., transmission request in this case) to the data server 131*a* by way of the base station 101*a* (in Step 505).

Thereafter, when the data server 131*a* approves the data communication request (i.e., if the answer to the query of the processing step 506 is YES), the control section 114*a* of the wireless terminal 111*a* starts the data communications (in Step 507). Next, the control section 114*a* waits until the data communications are done or interrupted (in Step 508). On the other hand, if the data server 131*a* has declined the data communication request (i.e., if the answer to the query of the processing step 506 is NO), then the control section 114*a* once withdraws the data communication request and then waits until a predetermined period of time passes (in Step 509).

Meanwhile, the control section 105*a* of the base station 101*a* selects routes to follow to establish the data communications between the wireless terminal 111*a* and the base station 101*a* over the wireless LAN communications network 201*a* and to establish the data communications between the data server 131*a* and the base station 101*a* over the wired LAN communications network 202, and then gets the data communications between the wireless terminal 111*a* and the data server 131*a* opened up.

On receiving another data communication request from the wireless terminal 111*a* by way of the base station 101*a* (in Step 601 shown, in FIG. 4), the control section 133*a* of the data server 131*a* determines whether or not the data server 131*a* is communicating with another wireless terminal by now. If the answer is NO (i.e., if the answer to the query of the processing step 602*a* is NO), then the control section 133*a* approves the data communication request from that wireless terminal 111*a* and opens up the data communications with the wireless terminal 111*a* (in Step 606).

On the other hand, if the data server 131*a* is already communicating with another wireless terminal 111*b* (i.e., if the answer to the query of the processing step 602*a* is YES), then the control section 133*a* compares the property information that has been received from the wireless terminal 111*b* to the property information that has been newly received along with the data communication request from the wireless terminal 111*a* (in Step 603). Based on the result of the comparison, the control section 133*a* determines which of these two wireless terminals 111*a* and 111*b* should be given the higher priority (i.e., selects either the wireless terminal 111*b* that is already communicating with the data server 131*a* or the wireless terminal 111*a* that has newly issued the data communication request) in Step 604. If the property information includes the size of the remaining data yet to be transmitted and/or a value representing the link rate, then the control section 133*a* compares those values to each other and gives the higher priority to the data communications requested by the wireless terminal with the greater value, for example.

If the control section 133*a* has decided to give the higher priority to the wireless terminal 111*b* that is already communicating data with the data server 131*a* (i.e., if the answer to the query of the processing step 604 is NO), the control section 133*a* declines the data communication request that has been newly received from the wireless terminal 111*a* (in Step 607). On the other hand, if the control section 133*a* has decided to give the higher priority to the wireless terminal 111*a* that has newly issued the data communication request (i.e., if the answer to the query of the processing step 604 is YES), then the control section 133*a* interrupts the ongoing data communications with the wireless terminal 111*b* (in Step 605), approves the data communication request from the wireless terminal 111*a*, and opens up the data communications with the wireless terminal 111*a* (in Step 606).

If the control section 133*a* has interrupted the ongoing data communications with the wireless terminal 111*b*, then the control section (not shown) of the wireless terminal 111*b* stops waiting until the communications are done or interrupted (i.e., stops performing the processing step 508) and the process goes back to the processing step 501. In that case, since there is some data yet to be transmitted due to the interruption, the wireless terminal 111b waits until the data communications with the wireless terminal 111a are done (i.e., the processing steps 501 through 506 and 509 are repeated). When the data server 131a approves the data communication request issued by the wireless terminal 111b after the data communications with the wireless terminal 111a are done, the remaining data yet to be transmitted from the wireless terminal 111b resumes being transmitted.

By performing these processing steps, the wireless communications control system 100 of this preferred embodiment carries out a band control on data communication with multiple wireless terminals by way of the base station 101a by exchanging data communications preferentially with one of the wireless terminals that is given the higher priority first and then sequentially exchanging data communications with the other wireless terminals with lower degrees of priority. As a result, the sum of the amounts of time it takes to exchange communications with the respective wireless terminals can be reduced effectively.

Optionally, after having exchanged data communications with the wireless terminal 111a, the data server 131a may open up communications with the wireless terminal 111b even without awaiting a communication request from the wireless terminal 111b. To do that, the control section 133a of the data server 131a needs to store information indicating that the data server 131a was communicating with the wireless terminal 111b before opening up communications with the wireless terminal 111a and that there is some data yet to exchange.

In the processing step 604 described above, if the data server 131a has decided to maintain data communications with the wireless terminal 111b, the control section 133a of the data server 131a may store the communication request from the wireless terminal 111a and the history (or log) of the property information. In that case, the data server 131a may open up data communications with the wireless terminal 111a even without awaiting a communication request from the wireless terminal 111a as soon as the data server 131a has exchanged data communications with the wireless terminal 111b. Optionally, when opening up data communications with the wireless terminal 111a, the control section 133a of the data server 131a may acquire the property information of the wireless terminal 111a again.

Also, the wireless communications control system 100 of this preferred embodiment realizes, at a reduced cost, the band control function that the user of wireless communications needs even by using a base station with no band control capabilities.

In the preferred embodiment described above, the SSID of the base station and the channel number of the wireless LAN used are supposed to be used as pieces of information to identify the base station. Alternatively, the MAC (media access control) address of the base station or the fixed IP (Internet protocol) address assigned to it may also be used. In short, any kind of information may be used as long as it contributes to identifying the base station.

Also, in the preferred embodiment described above, architecture with two wireless terminals is supposed to be used. However, the architecture may also include three or more wireless terminals.

Embodiment 2

Figure 5:
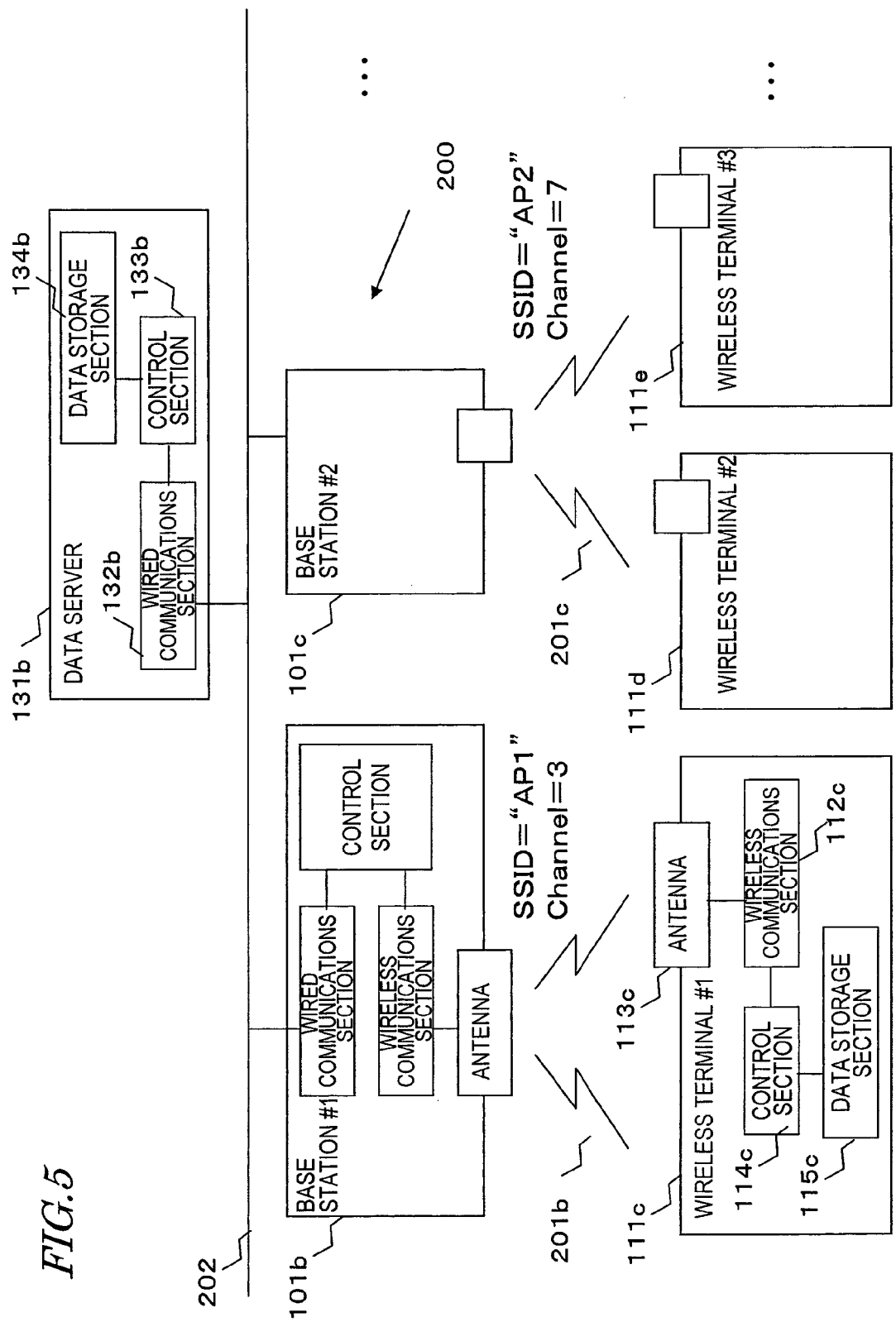
FIG. 5 is a block diagram illustrating the architecture of a wireless communications control system 200 as a second specific preferred embodiment of the present invention.

FIG. 5 is a block diagram illustrating the architecture of a wireless communications control system 200 as a second specific preferred embodiment of the present invention.

Unlike the wireless communications control system 100 of the first preferred embodiment described above, this preferred embodiment includes a plurality of base stations 101b and 101c. However, each of these base stations has the same components as the counterpart of the first preferred embodiment, and the description thereof will be omitted herein.

Figure 6:
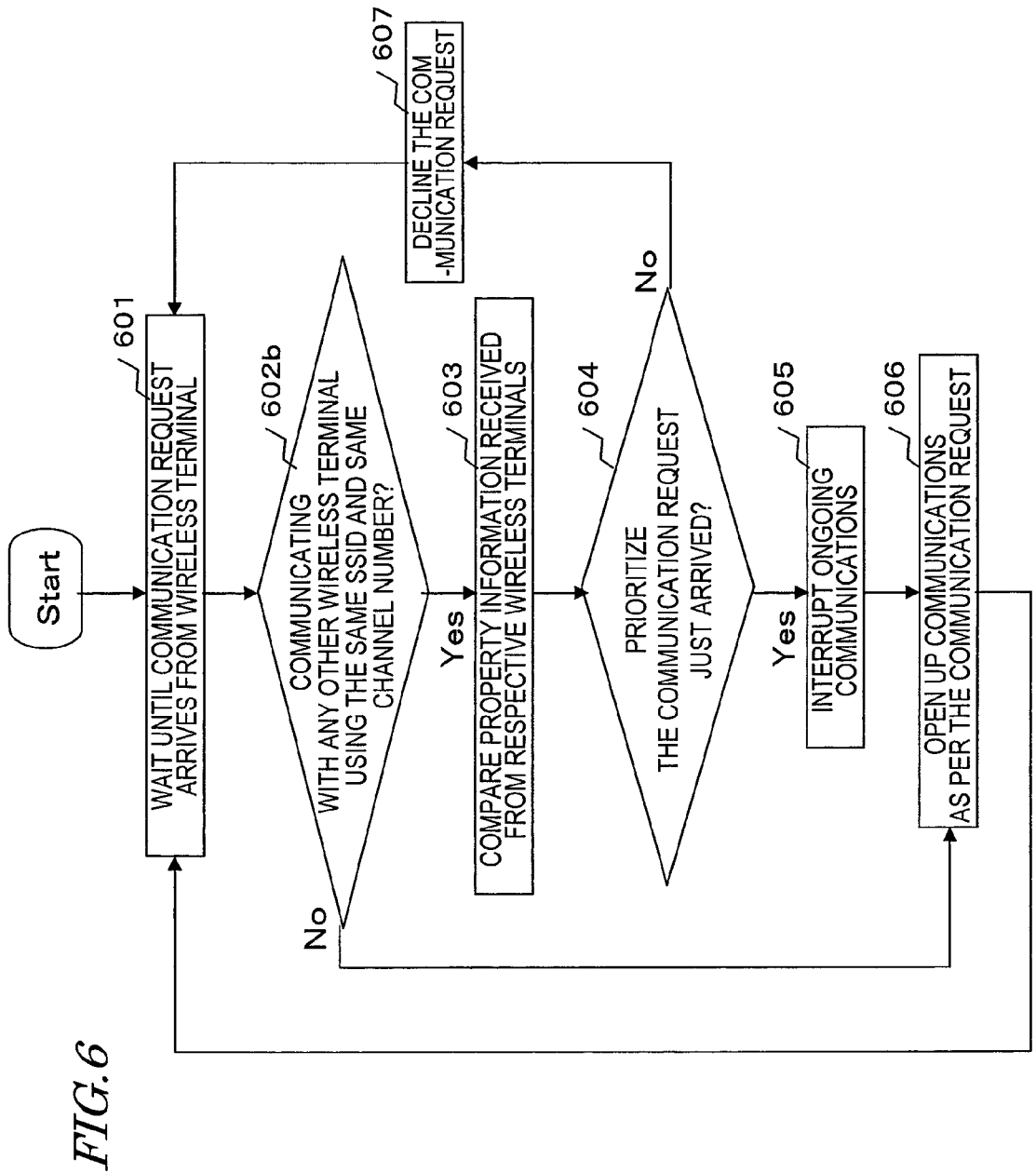
FIG. 6 is a flowchart showing how the control section 133b of the data server 131b controls the wireless communications according to the second preferred embodiment.

FIG. 6 is a flowchart showing how the control section 133b of the data server 131b controls the wireless communications according to this preferred embodiment.

Unlike the flowchart followed by the control section 133a of the data server 131a of the first preferred embodiment, the SSID of the base station and the channel number of the wireless LAN used that have been received from a wireless terminal are used according to this preferred embodiment in the processing step 602b of determining whether or not the data server is communicating with another wireless terminal by now.

Hereinafter, differences between the architecture of the wireless communications control system 200 of this preferred embodiment and that of the wireless communications control system 100 of the first preferred embodiment will be described with reference to FIGS. 5 and 6. In the following description, any component having substantially the same function as the counterpart of the first preferred embodiment described above will be identified by the same reference numeral and the detailed description thereof will be omitted herein.

If there are multiple base stations 101b and 101c, multiple wireless communications networks 201b and 201c provided by those base stations ordinarily use mutually different wireless LAN channel numbers so as not to decrease the rate due to the interference of their radio waves. In FIG. 5, the network 201b uses wireless LAN channel #3 and the network 201c uses wireless LAN channel #7 as an example. Optionally, to avoid an unwanted situation where a particular base station should establish a communications link with multiple wireless terminals 111c, 111d and 111e, mutually different SSIDs may be given to those base stations 101b and 101c so that the wireless terminals that can be linked to those base stations are distributed. In the example illustrated in FIG. 5, the SSIDs of the base stations 101b and 101c are defined to be AP1 and AP2, respectively, and the wireless terminals 111c, 111d, and 111e are distributed so that the wireless terminal 111c is linked to the base station with the SSID of AP1 and that the other wireless terminals 111d and 111e are linked to the base station with the SSID of AP2.

In this preferred embodiment, the base stations 101b and 101c have mutually different sets of SSIDs and channel numbers of wireless LAN used. That is why each base station is identifiable by its associated set of SSID and channel number of wireless LAN used on the network of the wireless communications control system 200.

By using SSIDs and wireless LAN channel numbers, the respective base stations are identifiable from each other on the networks of the wireless communications control system 200. Thus, according to this preferred embodiment, such a set of SSID and channel number of wireless LAN used is used as a piece of information to identify the base station, i.e., base station identifying information.

Hereinafter, it will be described with reference to FIG. 6 how the wireless communications control system 200 of this preferred embodiment works.

The control section 133b of the data server 131b waits for a data communication request to newly arrive from the wireless terminal 111d. In this preferred embodiment, each wireless terminal transmits not only the property information as described for the first preferred embodiment but also base station identifying information as well. Thus, the data server 131b receives the property information and the base station identifying information.

In the first preferred embodiment described above, the SSID and the channel number of wireless LAN used COULD BE included as pieces of property information. According to this preferred embodiment, on the other hand, the base station identifying information is transmitted and received in order to clearly indicate that the property information MUST include those pieces of property information. And if the property information always includes the SSID and the channel number of wireless LAN used, it could be said that just the property information is all that needs to be transmitted and received.

On receiving a communication request from a wireless terminal (in Step 601), the control section 133b of the data server 131b determines, by the base station identifying information, whether or not the data server 131b is communicating with another wireless terminal by now. If the data server 131b is not exchanging data communications with any other wireless terminal (such as the wireless terminal 111e) (i.e., if the answer to the query of the processing step 602b is NO), then the control section 133b approves the data communication request from the wireless terminal 111d and opens up data communications with the wireless terminal 111d (in Step 606).

On the other hand, if the data server 131b is already exchanging data communications with another wireless terminal 111e, then the control section 133b compares the base station identifying information (i.e., the SSID of the base station and the channel number of the wireless LAN used) that was received when a data communication request arrived from that wireless terminal 111e to the base station identifying information of the wireless terminal 111d (i.e., the SSID of the base station and the channel number of the wireless LAN used) that has just been newly received from the wireless terminal 111d. If it has turned out, as a result of the comparison, that those pieces of base station identifying information are different from each other, then it is determined that those wireless terminals are associated with mutually different base stations (i.e., the answer to the query of the processing step 602b is NO). In that case, the control section 133b approves the data communication request from the wireless terminal 111d and opens up data communications with the wireless terminal 111d.

On the other hand, if those pieces of base station identifying information are the same, then it is determined that those wireless terminals are associated with the same base station (i.e., the answer to the query of the processing step 602b is YES). In that case, a single wireless terminal to exchange data communications with is selected for each of the base stations to be identified by the base station identifying information.

For that purpose, the control section 133b compares the property information (such as the link rate information with respect to the base station) that was received when a data communication request arrived from that wireless terminal 111e to the property information (such as the link rate information with respect to the base station) that has just been newly received along with the data communication request from the wireless terminal 111d.

Based on a result of the comparison, the control section 133b determines whether the higher priority should be given to the wireless terminal that is already exchanging data communications with or the wireless terminal 111d from which a data communication request has just arrived newly (in Step 604). If the control section 133b has decided to give the higher priority to the wireless terminal that is already exchanging data communications with (i.e., if the answer to the query of the processing step 604 is NO), then the control section 133b declines the data communication request that has just arrived newly from the wireless terminal 111d. On the other hand, if the control section 133b has decided to give the higher priority to the wireless terminal 111d that has just issued the data communication request (i.e., if the answer to the query of the processing step 604 is YES), then the control section 133b interrupts the ongoing data communications with the wireless terminal 111e (in Step 605), approves the data communication request from the wireless terminal 111d, and opens up data communications with the wireless terminal 111d (in Step 606).

If there are multiple different pieces of base station identifying information, this series of processing steps are carried out on each of the base stations to be identified by the base station identifying information. As a result, the wireless terminal to exchange data communications with by way of each base station is determined.

By performing these processing steps, the wireless communications control system of this preferred embodiment changes the modes of data communications according to the specific situation where multiple wireless terminals are exchanging data communications by way of a single or multiple base stations. Specifically, if multiple wireless terminals are exchanging data communications by way of multiple different base stations, the wireless communications control system maintains concurrent data communications in parallel with each other. On the other hand, if multiple wireless terminals are exchanging data communications by way of the same base station, then the wireless communications control system attempts to establish data communications with one of those wireless terminals that has the highest degree of priority first, and then sequentially opens up data communications with one of the remaining wireless terminals after another upon the completion of the data communication with the highest priority. In this manner, the sum of the amounts of time it takes for the respective wireless terminals to establish data communications can be reduced effectively while using the bands of multiple wireless communications networks efficiently.

Also, the wireless communications control system 200 of this preferred embodiment realizes the band control function that the user of wireless communications needs even by using a base station with no band control capabilities. That is why if there is such a base station with no band control capabilities, then the user does not have to purchase a replacement for that base station but just needs to buy a wireless terminal and a data server that have the functions to perform the processing described above. As a result, the wireless communications control system 200 is realized at a reduced cost.

In the preferred embodiment described above, the SSID of the base station and the channel number of the wireless LAN used are supposed to be used as pieces of information to identify the base station (i.e., the base station identifying information). Alternatively, the MAC address of the base station, the fixed IP address assigned to it, or the manufacturing serial number of the base station may also be used. In short, any kind of information may be used as long as it contributes to identifying the base station.

Also, in the preferred embodiment described above, the plurality of base stations and the number of wireless communications networks provided by the base station are both supposed to be two. However, the numbers may also be three or more.

Furthermore, in the preferred embodiment described above, architecture with three wireless terminals is supposed to be used. However, the architecture may also include two wireless terminals or four or more wireless terminals.

Embodiment 3

Figure 7:
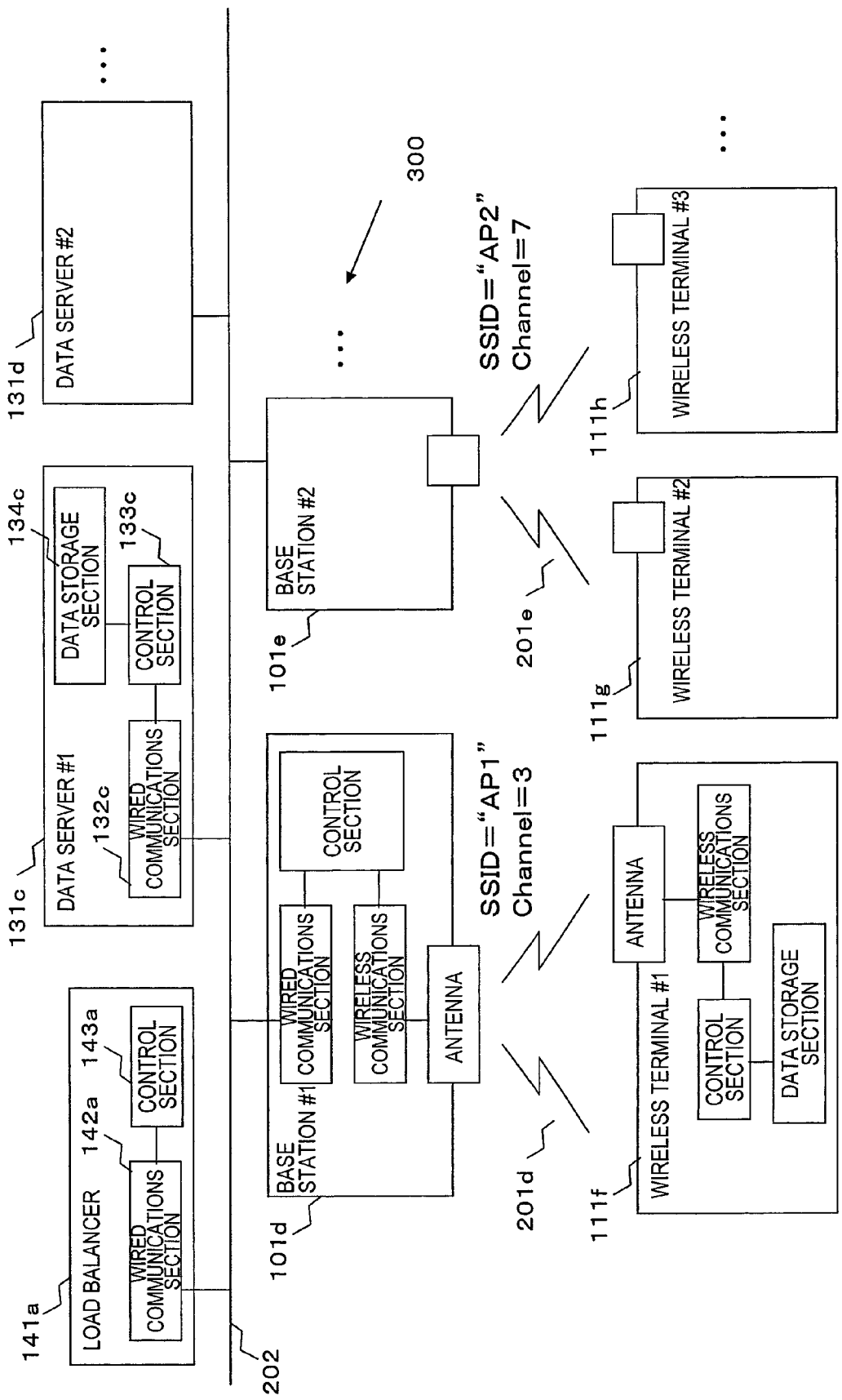
FIG. 7 is a block diagram illustrating the architecture of a wireless communications control system 300 as a third specific preferred embodiment of the present invention.

FIG. 7 is a block diagram illustrating the architecture of a wireless communications control system 300 as a third specific preferred embodiment of the present invention.

Unlike the wireless communications control system 200 of the second preferred embodiment described above, the wireless communications control system 300 of this preferred embodiment includes multiple data servers 131c and 131d on the wired communications network 202 and further includes a load balancer 141 that can control the wireless communications in place of the data server.

It should be noted that each of the base stations 101d and 101e, the wireless terminals 111f, 111g and 111h and the data servers 131c and 131d includes quite the same components as its counterpart of the first and second preferred embodiments described above. Thus, a detailed description of those components will be omitted herein. Instead, the following description will be focused on the load balancer 141a and its associated components.

As shown in FIG. 7, the load balancer 141a includes a wired communications section 142a and a control section 143a.

The load balancer 141a could be implemented as a PC that carries out the functions to be described later or as one of the integral components in the wireless communications control system 300.

Figure 8:
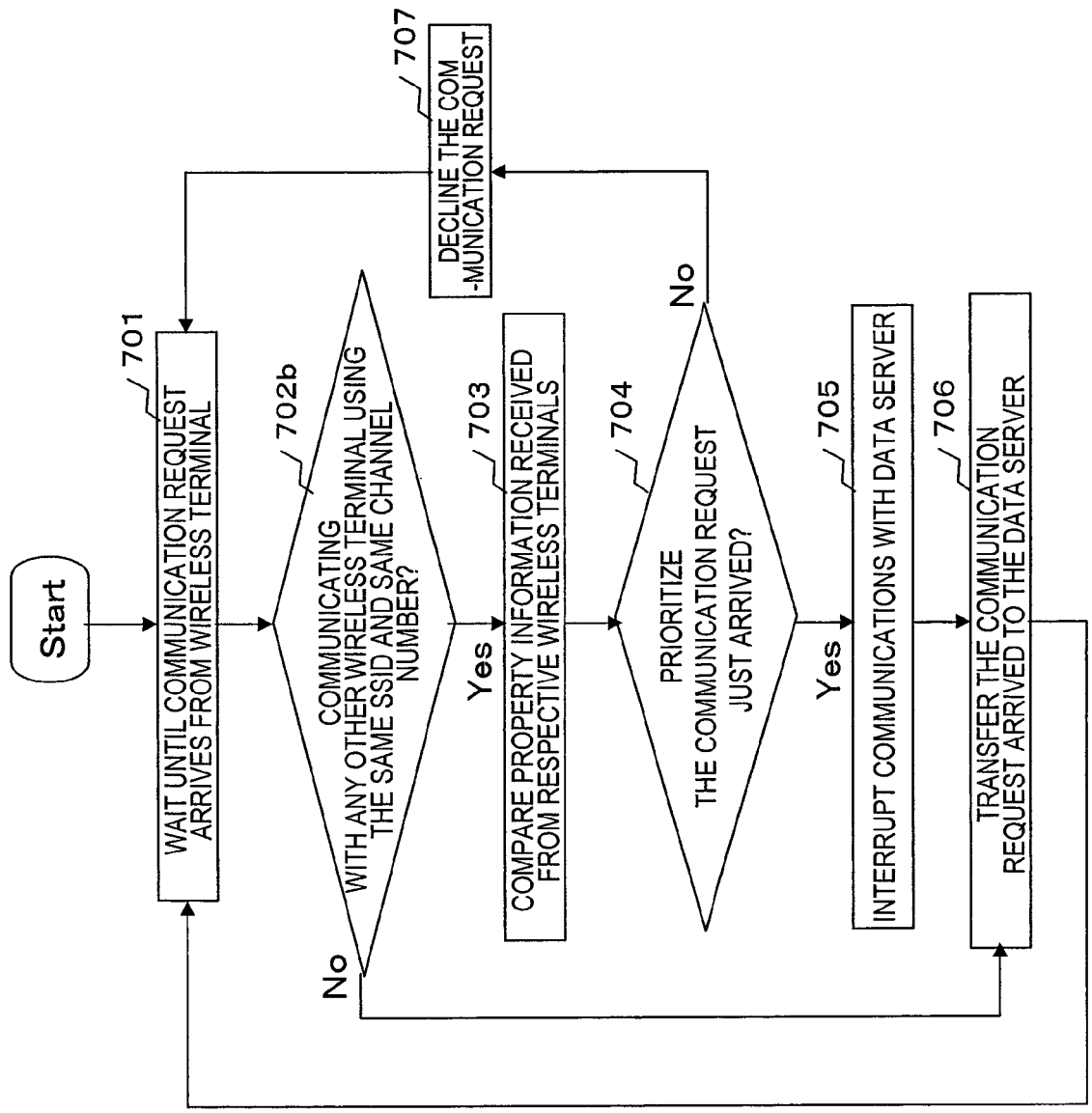
FIG. 8 is a flowchart showing how the control section 143a of the load balancer 141a controls the wireless communications according to the third preferred embodiment.

FIG. 8 is a flowchart showing how the control section 143a of the load balancer 141a controls the wireless communications according to this preferred embodiment. This flowchart is almost the same as the one showing how the data server 131b controls the wireless communications according to the second preferred embodiment. The only difference between them is that this flowchart further includes the additional processing step 706 of transferring the communication request arrived to the data server.

To make that difference even more noticeable, the difference between the architecture of the wireless communications control system 300 of this preferred embodiment and that of the wireless communications control system 200 of the second preferred embodiment will be described in detail with reference to FIGS. 7 and 8.

If a lot of wireless terminals are exchanging data communications concurrently over a large-scale wireless communications network in which there are a number of base stations, each providing a wireless communications network, and in which there are a lot of wireless terminals that can be linked to each of those base stations, multiple data servers 131c and 131d could be needed to lighten the processing load on the data server or to get troubleshooting done more quickly and more efficiently.

To install a load balancer is a normal technique for distributing data communications among multiple data servers. The load balancer performs the processing of distributing data communication requests, which arrive one after another, among multiple data servers by round robin algorithm, for example. In FIG. 7, the load balancer 141a for controlling wireless communications is arranged on the wired communications network 202 as an example.

First of all, the wireless terminals 111f, 111g and 111h issue a data communication request (i.e., a request to transmit data) with respect to the load balancer 141a, not the data server, by way of their linked base stations.

On receiving a data communication request that has been newly issued by a wireless terminal 111g (in Step 701), the control section 143a of the load balancer 141a determines whether or not the data server is communicating with another wireless terminal 111h by now. If the data server is not exchanging data communications with any other wireless terminal 111h (i.e., if the answer to the query of the processing step 702b is NO), then the control section 143a approves the data communication request from the wireless terminal 111g, determines to which of the data servers 131c and 131d the data communications need to be distributed by round robin algorithm, and then transfers the data communication request to that data server (in Step 706).

On the other hand, if the data server is already exchanging data communications with another wireless terminal 111h, then the control section 143a compares the SSID of the base station and the channel number of the wireless LAN used that were received when a data communication request arrived from that wireless terminal 111h to the SSID of the base station and the channel number of the wireless LAN used that have just been newly received from the wireless terminal 111g. If it has turned out, as a result of the comparison, that those wireless terminals are linked to mutually different base stations (i.e., if the answer to the query of the processing step 702b is NO), then the control section 143a approves the data communication request from the wireless terminal 111g, determines to which data server the data communications need to be distributed, and then transfers the data communication request to that data server (in Step 706).

However, if the base stations to which the respective wireless terminals are linked have turned out to be the same (if the answer to the query of the processing step 702b is YES), then the control section 143a compares the property information of the wireless terminal 111h that was received when a data communication request arrived from that wireless terminal 111h to the property information of the wireless terminal 111g that has just been newly received along with the data communication request from the wireless terminal 111g (in Step 703).

Based on a result of the comparison, the control section 143a determines whether the higher priority should be given to the wireless terminal that is already exchanging data communications with or the wireless terminal 111g from which a data communication request has just arrived newly (in Step 704). If the control section 143a has decided to give the higher priority to the wireless terminal that is already exchanging data communications with (i.e., if the answer to the query of the processing step 704 is NO), then the control section 143a declines the data communication request that has just arrived newly from the wireless terminal 111g (in Step 707). On the other hand, if the control section 143a has decided to give the higher priority to the wireless terminal 111g that has just issued the data communication request (i.e., if the answer to the query of the processing step 704 is YES), then the control section 143a interrupts the ongoing data communications with the wireless terminal 111h (in Step 705), approves the data communication request from the wireless terminal 111g while determining the data server to which the data communications should be sent, and then transfers the data communication request to that data server (in Step 706).

If a lot of wireless terminals are exchanging data communications concurrently by way of mutually different base stations over a large-scale wireless communications network in which there are a number of base stations, each providing a wireless communications network, and in which there are a lot of wireless terminals that can be linked to each of those base stations, the wireless communications control system 300 of this preferred embodiment establishes the data communications by getting the data servers distributed by the load balancer by performing the processing steps described above. On the other hand, if a plurality of wireless terminals are exchanging data communications by way of the same base station, then the wireless communications control system prioritizes, by reference to the property information, data communications with one of the wireless terminals that should be given the higher priority by getting the data server distributed by the load balancer. And when the data communications are done, the wireless communications control system sequentially establishes data communications with one of the remaining wireless terminals after another in the order of priority by getting the data server distributed by the load balancer again. By performing such a band control, data communications can be distributed to multiple data servers with the bands of multiple wireless communications networks used efficiently. As a result, the sum of the amounts of time it takes for the respective wireless terminals to establish communications can be reduced effectively.

Also, the wireless communications control system 300 of this preferred embodiment realizes, at a reduced cost, the band control function that the user of wireless communications needs even by using a base station with no band control capabilities.

In the preferred embodiment described above, the SSID of the base station and the channel number of the wireless LAN used are supposed to be used as pieces of information to identify the base station. Alternatively, the MAC address of the base station or the fixed IP address assigned to it may also be used. In short, any kind of information may be used as long as it contributes to identifying the base station.

Also, in the preferred embodiment described above, the number of base stations and the number of wireless communications networks provided by the base stations are both supposed to be two. However, the numbers may also be three or more.

Furthermore, in the preferred embodiment described above, architecture with three wireless terminals is supposed to be used. However, the architecture may also include two wireless terminals or four or more wireless terminals.

Also, in the preferred embodiment described above, two data servers are supposed to be used, but three or more data servers may be naturally used.

Furthermore, in the preferred embodiment described above, it is the load balancer that controls the wireless communications by distributing the data communication requests from a lot of wireless terminals. However, the same kind of control could be carried out by a single data server.

Embodiment 4

Figure 9:
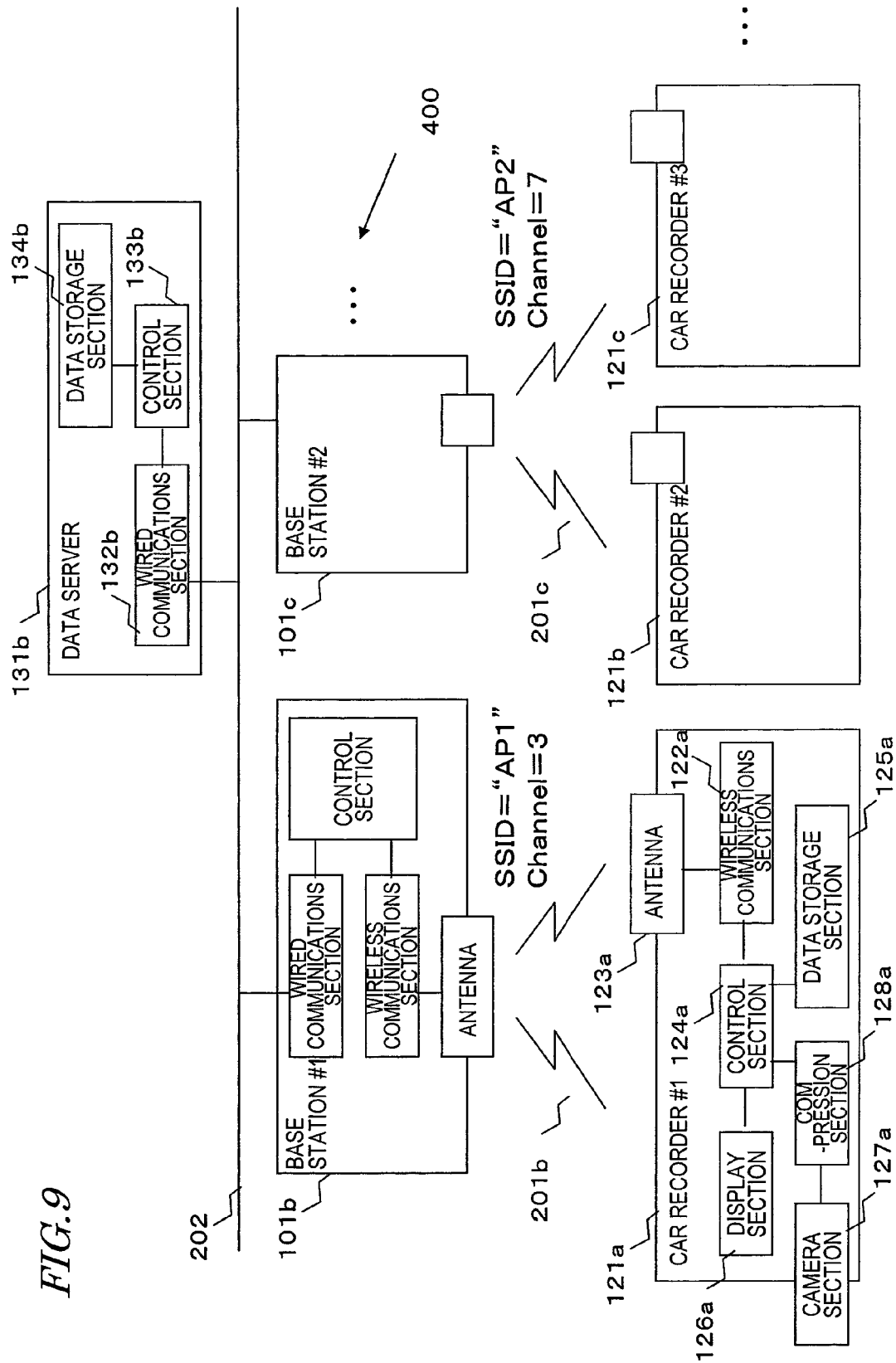
FIG. 9 is a block diagram illustrating the architecture of a wireless communications control system 400 as a fourth specific preferred embodiment of the present invention.

FIG. 9 is a block diagram illustrating the architecture of a wireless communications control system 400 as a fourth specific preferred embodiment of the present invention. This wireless communications control system 400 is used to record moving picture, still picture and/or audio data and store the written data in a data server using recorders 121a to 121c that are installed in a plurality of cars (which will be referred to herein as "car recorders"). Such a system is sometimes called an "In car camera video recording system".

The car recorders 121a to 121c may be installed in police squad cars, for example. With this system, a police squad car, which has just been back to a police station from a patrol, can transmit the captured data to the data server 131b by way of a base station that is installed in the police station. In that case, data communications with a police squad car or a police officer that has captured important video may be prioritized, and when those data communications are done, data communications with the car recorders installed in other police squad cars may be opened up. As the property information, each of the car recorders 121a to 121c may receive information to identify the police squad car in which the recorder is installed and an ID number to identify the police officer who drives the car.

Unlike the wireless communications control system 200 of the second preferred embodiment described above, the wireless communications control system 400 of this preferred embodiment includes car recorders 121a, 121b and 121c in place of the wireless terminals 111c, 111d and 111e, respectively.

As shown in FIG. 9, the car recorder 121a includes a wireless communications section 122a, a wireless LAN communications antenna 123a, a control section 124a, a data storage section 125a, a display section 126a, a camera section 127a and a compression section 128a.

The major functions of the car recorder 121a include converting video into digital data and storing it and uploading the digital data stored to the data server 131b. First, to perform the function of converting video into digital data and storing it, the camera section 127a captures video inside and outside of the car as a video signal. Next, the compression section 128a converts the video signal into compressed digital data by some video signal compression method such as MPEG 1/2/4 or H. 264. Thereafter, the control section 124a stores the compressed digital data in the data storage section 125a, which may be a digital data storage device such as a built-in or external hard disk drive, a removable semiconductor memory like an SD memory card, or a built-in flash memory.

On the other hand, to perform the function of uploading the digital data stored to the data server 131b, the car recorder 121a transmits the digital data stored in the data storage section 125a to the data server 131b by way of the wireless communications section 122a, the antenna 123a, the wireless communications network 201b, the base station 101b and the wired communications network 202 as in the second preferred embodiment described above.

Also, as for the function of uploading the digital data stored to the data server 131b, as digital video data is generally a huge amount of data, it often takes a lot of time to get such data transmitted. That is why while data of such a huge size is being transmitted, a dialog box is displayed on the screen of the display section 126a to alert the user of this car recorder 121a to the current data transmission status.

FIGS. 10A through 10D illustrate exemplary dialog boxes that may be displayed on the display section 126a of the car recorders 121a to 121c.

Figure 10C:
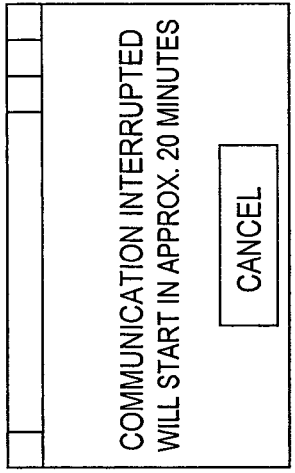
FIG. 10C illustrates an exemplary dialog box that may be displayed on the display section 126a of car recorders 121a to 121c.
Figure 10D:
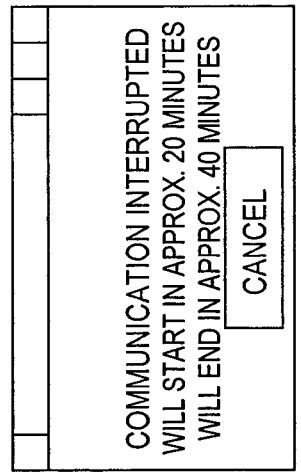
FIG. 10D illustrates an exemplary dialog box that may be displayed on the display section 126a of car recorders 121a to 121c.
Figure 10A:
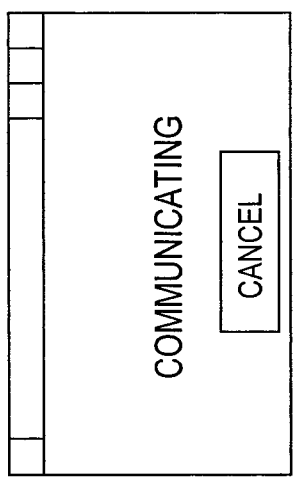
FIG. 10A illustrates an exemplary dialog box that may be displayed on the display section 126a of car recorders 121a to 121c.

FIG. 10A illustrates an exemplary dialog box indicating a communication exchanging state.

Specifically, the dialog box shown in FIG. 10A is displayed on the display section 126a to indicate that as a data transmission request that has been sent from the car recorder 121a to the data server 131b is approved through wireless communications control by the data server 131b, the data has started to be transmitted.

Figure 10B:
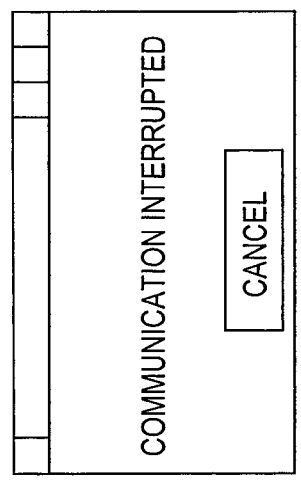
FIG. 10B illustrates an exemplary dialog box that may be displayed on the display section 126a of car recorders 121a to 121c.

FIG. 10B illustrates an exemplary dialog box indicating a communication waiting state.

Specifically, the dialog box shown in FIG. 10B is displayed on the display section 126a to indicate that as a data transmission request that has been sent from the car recorder 121a to the data server 131b is declined through wireless communications control by the data server 131b, the next communication request is now waited for.

FIG. 10C illustrates an exemplary dialog box indicating a communication waiting state along with an estimated start time.

Specifically, the dialog box shown in FIG. 10C is displayed on the display section 126a to not only indicate that the next communication request is now waited for as shown in FIG. 10B but also provide information about an estimated time when the next communication request will probably be approved and when the data will be ready to be transmitted. The estimated data transmission start time can be calculated either by the data server 131b based on the property information obtained from the other car recorder that the data server 131b is now exchanging data communications with or by the car recorder 121a based on the information collected by the car recorder 121a itself from the data server 131b.

FIG. 10D illustrates an exemplary dialog box indicating a communication waiting state along with an estimated start time and an estimated end time.

The dialog box shown in FIG. 10D is displayed on the display section 126a to provide not only the information displayed on the screen shown in FIG. 10C but also information about an estimated time when the data that has already started to be transmitted will probably get transmitted completely. The estimated data transmission end time can be calculated by the car recorder 121a based on the link rate of the wireless communications network 201b established between the car recorder 121a and the base station 101b and the size of the data stored in the data storage section 125a that is going to transmit the data. Optionally, the data communication running time that has passed since the data started to be transmitted may be displayed on the display section 126a.

As described above, the wireless communications control system 400 (i.e., the in car camera video recording system) of this preferred embodiment changes the modes of data communications according to the specific situation where multiple car recorders are exchanging data communications by way of a single or multiple base stations. Specifically, if multiple recorders are exchanging data communications by way of multiple different base stations, the wireless communications control system maintains concurrent data communications in parallel with each other. On the other hand, if multiple car recorders are exchanging data communications by way of the same base station, then the wireless communications control system attempts to establish data communications with one of those car recorders that has the highest degree of priority first, and then sequentially opens up data communications with one of the remaining car recorders after another upon the completion of the data communication with the highest priority. By performing such a band control, the sum of the amounts of time it takes for the respective car recorders to establish data communications can be reduced effectively while using the bands of multiple wireless communications networks efficiently.

Also, the in car camera video recording system that carries out the wireless communications control method of this preferred embodiment realizes, at a reduced cost, the band control function that the user of wireless communications needs even by using a base station with no band control capabilities.

Furthermore, the in car camera video recording system that carries out the wireless communications control method of this preferred embodiment can provide the user with an on-screen display indicating the processing status of data transmission that it would take a lot of time to get done, and therefore, will come in handier for him or her. It should be noted that the display section does not have to be provided for every car recorder 121a through 121c. Nevertheless, the user of a car recorder with the display section can check the status of the data transmission any time just by casting a glance at the screen.

In the preferred embodiment described above, the SSID of the base station and the channel number of the wireless LAN used are supposed to be used as pieces of information to identify the base station. Alternatively, the MAC address of the base station or the fixed IP address assigned to it may also be used. In short, any kind of information may be used as long as it contributes to identifying the base station.

Also, in the preferred embodiment described above, the number of base stations and the number of wireless communications networks provided by the base stations are both supposed to be two. However, the numbers may also be three or more. Or even a single base station may be used and only one wireless communications network may be provided by the single base station.

Furthermore, in the preferred embodiment described above, architecture with three car recorders is supposed to be used. However, the architecture may also include two car recorders or four or more car recorders.

Furthermore, in the preferred embodiment described above, four different types of dialog boxes are supposed to be used to notify the user of the current data transmission status. However, any other sort of information that can be calculated by either a data server or a car recorder may also be displayed on the screen as long as that information contributes to carrying out the wireless communications control method of this system.

The wireless communications control method, system, apparatus and program of the present invention realize, at a reduced cost, the band control function that the user of wireless communications needs even by using a base station with no band control capabilities, and therefore, are effectively applicable to a car recorder, an in car camera video recording system, and a network system for exchanging data communications through wireless communications using a wireless LAN or a mobile communications network.

What is claimed is:

1. A wireless communications control system comprising: a data server; at least one base station; and a plurality of wireless terminals, each of which exchanges data communications with the data server by establishing wireless communications with the base station, wherein if the number of the at least one base station is one, each said wireless terminal includes:

a control section for generating, as property information representing its own property, at least one of information indicating the operating status of the wireless terminal, information identifying the wireless terminal itself, and information identifying the user of the wireless terminal; and a wireless communications section for transmitting the property information to the base station, and the data server includes:

a communications section for receiving the property information from the respective wireless terminals by way of the base station; and a control section for choosing, by reference to the property information received, one of the wireless terminals to exchange the data communications with, and wherein the control section of the data server exchanges the data communications with the wireless terminal chosen, wherein if while exchanging data communications with a first one of the wireless terminals, the data server receives a data communication request and property information from a second one of the wireless terminals, the control section of the data server determines, by reference to the property information of the first wireless terminal and the property information received from the second wireless terminal, which of the first and second wireless terminals needs to be given the priority to maintain or establish the data communications with.

2. The wireless communications control system of claim 1, wherein if the at least one base station includes a plurality of base stations, those base stations are identifiable from each other on a network, and
wherein each said wireless terminal establishes the wireless communications with one of those base stations, and
wherein the wireless communications section of each said wireless terminal transmits the property information and base station identifying information to identify the base station to establish the wireless communications with, and
wherein the communications section of the data server receives the property information and the base station identifying information from the respective wireless terminals by way of the base stations, and
wherein the control section of the data server determines the wireless terminal to exchange the data communications with by base station basis by reference to the property information and the base station identifying information received.

3. The wireless communications control system of claim 1, wherein the property information includes at least one of a link rate between the base station and each said wireless terminal, an estimated time when the data communications are expected to end, a running time that has passed since the data communications were opened up, the available space in a data storage section of each said wireless terminal, and a constant defined for each said wireless terminal.

4. The wireless communications control system of claim 1, wherein if it has been determined that the second wireless terminal has the priority to establish the data communications with,
the control section of the data server interrupts the ongoing data communications and opens up data communications with the second wireless terminal newly chosen.

5. The wireless communications control system of claim 2, wherein the base station identifying information includes at least one of an SSID, an MAC address and an IP address that have been given to the base station.

6. The wireless communications control system of claim 2, wherein the base stations are identified by mutually different kinds of base station identifying information, and
wherein the control section of the data server determines which wireless terminal has the priority to establish data communications for each set of wireless terminals that have transmitted the same kind of base station identifying information.

7. The wireless communications control system of claim 6, wherein by comparing pieces of the property information of multiple wireless terminals, belonging to mutually different sets, to each other, the control section of the data server determines which wireless terminal has the priority to establish the data communications.

8. The wireless communications control system of claim 2, wherein one of the wireless terminals further includes a display section to display information thereon, and
wherein the display section displays at least one of information indicating that the data communications are now in progress, information indicating that the data communications now need to wait, estimated start and end times of the data communications and the running time that has passed since the data communications were opened up.

9. A wireless communications control system comprising:
a base station;
a plurality of data servers;
a plurality of wireless terminals, each of which exchanges data communications with an associated one of the data servers by establishing wireless communications with the base station; and
a load balancer for distributing data communications between the wireless terminals and the data servers,
wherein each said wireless terminal includes:
a control section for generating, as property information representing its own property, at least one of information indicating the operating status of the wireless terminal, information identifying the wireless terminal itself, and information identifying the user of the wireless terminal; and
a wireless communications section for transmitting the property information to the base station, and
wherein the load balancer includes:
a communications section for receiving the property information from the respective wireless terminals by way of the base station; and
a control section for choosing, according to the property information received, one of the wireless terminals and one of the data servers between which the data communications need to be exchanged, and
wherein the control section of the load balancer exchanges the data communications with the wireless terminal chosen,
wherein if while exchanging data communications with a first one of the wireless terminals, the load balancer receives a data communication request and property information from a second one of the wireless terminals,
the control section of the load balancer determines, by reference to the property information of the first wireless terminal and the property information received from the second wireless terminal, which of the first and second wireless terminals needs to be given the priority to maintain or establish the data communications with.

10. The wireless communications control system of claim 9, wherein if it has been determined that the second wireless terminal has the priority to establish the data communications with,
the control section of the load balancer interrupts the ongoing data communications and opens up data communications with the second wireless terminal newly chosen.

11. A wireless communications control method for use in a wireless communications control system that includes: a data server; at least one base station; and a plurality of wireless terminals, each of which exchanges data communications with the data server by establishing wireless communications with the base station,
wherein if the number of the at least one base station is one, the method comprises the steps of:
having each said wireless terminal generate, as property information representing its own property, at least one of information indicating the operating status of the wireless terminal, information identifying the wireless terminal itself, and information identifying the user of the wireless terminal;
getting the property information transmitted by the wireless terminal to the base station;

getting the property information received by the data server from the respective wireless terminals by way of the base station;

having the data server choose, by reference to the property information received, one of the wireless terminals to exchange the data communications with; and letting the data server exchange the data communications with the wireless terminal chosen, wherein if while exchanging data communications with a first one of the wireless terminals, the data server receives a data communication request and property information from a second one of the wireless terminals, the data server determines, by reference to the property information of the first wireless terminal and the property information received from the second wireless terminal, which of the first and second wireless terminals needs to be given the priority to maintain or establish the data communications with.

* * * * *